United States Patent [19]

Daugherty et al.

[11] 4,283,686
[45] Aug. 11, 1981

[54] LASER OPERATION WITH CLOSED GAS AND TUNED DUCT PULSING

[75] Inventors: Jack D. Daugherty, Winchester; Arthur R. Kantrowitz, Cambridge; George W. Sutton, Lexington; Oswald L. Zappa, Stoneham, all of Mass.

[73] Assignee: Avco Everett Research Laboratory, Inc., Everett, Mass.

[21] Appl. No.: 22,259

[22] Filed: Mar. 21, 1979

[51] Int. Cl.³ .............................................. H01S 3/05
[52] U.S. Cl. ............................ 331/94.5 G; 331/94.5 P
[58] Field of Search ..................... 331/94.5 G, 94.5 P, 331/94.5 PE, 94.5 D

[56] References Cited

U.S. PATENT DOCUMENTS

| | | | |
|---|---|---|---|
| 3,582,821 | 6/1971 | Gordon et al. | 331/94.5 D |
| 3,702,973 | 11/1972 | Daugherty et al. | 331/94.5 G |
| 3,863,103 | 1/1975 | Eckbreth et al. | 331/94.5 G |
| 3,886,477 | 5/1975 | Ruby et al. | 331/94.5 G |
| 3,919,662 | 11/1975 | Born | 331/94.5 G |
| 3,936,772 | 2/1976 | Sucov et al. | 331/94.5 PE |

Primary Examiner—William L. Sikes
Assistant Examiner—Léon Scott, Jr.
Attorney, Agent, or Firm—Melvin E. Frederick

[57] ABSTRACT

In a pulsed gas laser, pulses of electrical or other energy are desirably converted in part into pulses of quantum mechanical pumping of the lasable gas, and unavoidably converted in part into pulses of heating of the lasable gas. According to this invention, efficiency and economy of operation are enhanced by exploiting the pulses of heating to propel and recirculate the gas through cooling means to freshen it thermally for further cycles of lasing, utilizing a structure comprising an acoustically tuned duct and an acoustic diode to establish proper phasing and direction of the pulsed and recirculating operation. The invention, although applicable to other gas lasers, is particularly applicable to electron beam ionized, electrical current sustained lasers. The invention reduces if not eliminates the cost, bulk and other disadvantages of a mechanical pump or other conventional recirculation equipment. Cooling of the recirculating gas is accomplished, at least in part and preferably in large measure, by injection of make-up gas of the lasable gas composition under cooling conditions.

8 Claims, 5 Drawing Figures

LASER OPERATION WITH CLOSED GAS AND TUNED DUCT PULSING

BACKGROUND OF THE INVENTION

The present invention relates to high power gas lasers and more particularly to gas lasers of the type which are electron beam pumped and subjected to sustaining pulsing currents of the type described, for example, in U.S. Pat. No. 3,702,973.

High power laser structures of this general class have been built and operated in closed circuit (substantially closed circuit with some gas loss or deliberate bleed off and consequent need for limited make-up gas supply) modes as described for example in U.S. Pat. No. 3,921,098. The circulation of large amounts of gas under varying pressure and temperature conditions has been adapted to a substantial extent from closed circuit gas recirculation technology of wind tunnels and the like. The principal means for gas recirculation in the art are mechanical pumps such as fans or compressors which involves substantial weight, bulk and cost to the system and require energy.

It is an important object of the invention to enhance the economy and efficiency of gas laser apparatus.

SUMMARY OF THE INVENTION

In accordance with the present invention, one utilizes the existing characteristic of electrically (and otherwise except chemically) pumped gas lasers that only a small fraction of the pumping energy introduced into the gas to quantum mechanically pump the gas is converted into the laser output. A larger fraction of pumping energy is converted into heat, elevating the temperature of the lasing gas (or more precisely the gas mixture including a lasable gas). This characteristic has been principally regarded in the art as a problem of removal of such gas mixture and replacement by a mixture at the desired temperature to prevent heat buildup which would be excessive in relation to the tolerance of the laser cavity defining materials or lasing conditions. Such removal and replacement have been operated in open loop and closed loop forms.

The present invention utilizes such heat to accomplish closed loop pumping recirculation, and the conversion is effected through a wave pump by the following structural combination:

(a) means defining a closed loop or essentially closed loop gas circulation duct system with a lasing cavity and heat exchanger therein,
(b) acoustic diode means in the closed loop, upstream of the cavity, and
(c) downstream of the cavity, a wave pump of tuned duct form based on the pulse jet, or resonant type jet propulsion motor, essentially as invented by Lorin in France prior to WW I and well-known as a Lorin duct.

Pulse jets were utilized during WW II to propel the V-1 Buzz Bombs and comprised a combustion chamber with an acoustic diode made of hinged inlet vanes upstream of the combustion chamber and a tubular nozzle downstream of the combustion chamber with tuned length (in relation to the inlet valves and the necessary resonant conditions associated with the desired flight velocity). Operation of the combustion chamber would establish expansion and compression waves within the tuned nozzle (duct) and the expansion waves would automatically open the inlet valve and the compression waves would automatically close it to establish pulsing operation of the jet and pulsing combustion without spark ignition other than in connection with start-up. The pulsing jet moves the aircraft through reaction propulsion. The present invention involves the establishment of superficially similar structure to increase momentum of the gas mixture in the lasing cavity within the closed loop recirculation path to an extent assuring recirculation.

As applied herein, the acoustic diode-lasing cavity-Lorin duct combination uses a pressure wave, formed in the lasing cavity during cyclic sustainer current pulses therein, which travels down the length of the Lorin duct and is reflected back along the cavity with a sign (phase) change—from compression to expansion form, or vice versa.

Utilization of the apparatus, particularly in closed loop form is dependent upon adequate cooling of the circulating gas mixture if the wave pump is to serve as the sole recirculating means. Such cooling may be effected by indirect heat exchange and/or injection of cooled fluid, the latter being necesssary for fast response (particularly in connection with quick start-up of the apparatus).

Other objects, features and advantages of the invention will be apparent from the following detailed description of preferred embodiments thereof, taken in connection with the accompanying drawings, in which:

BRIEF DESCRIPTION OF THE DRAWINGS

FIG. 2A is a simplified form of this apparatus used to define thermodynamic cycle portion locations therein and FIGS. 2B and 2C are approximate thermodynamic cycle P-V and T-S diagrams, respectively, characterizing the operation of the FIG. 1 apparatus;

DETAILED DESCRIPTION OF PREFERRED EMBODIMENTS

Figure 1:
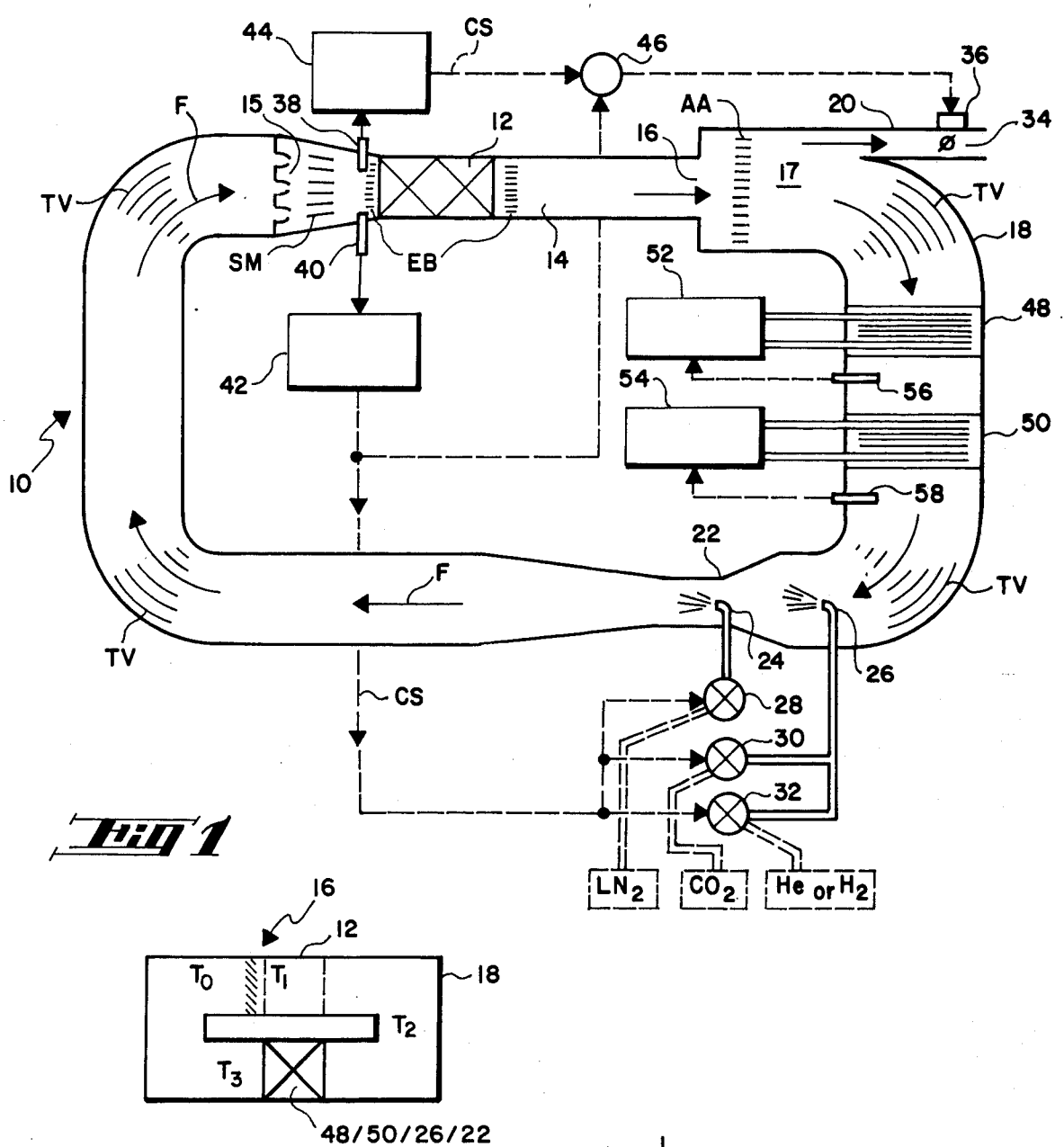
FIG. 1 is a schematic diagram of a closed loop laser energizing system in accordance with a preferred embodiment of the invention.

FIG. 1 shows a preferred embodiment of practice of the invention comprising a laser powering apparatus. The apparatus 10 includes a lasing cavity 12 of the type generally described in the aforementioned U.S. Pat. No. 3,702,973 granted Nov. 14, 1972 to Daugherty et al and which is of common assignment with this application. Electrode and electron beam generating portions of such lasing apparatus, as well as optical reflectors, all well-known to those skilled in the art, per se, at this time, are not shown in the drawing. The lasing cavity is immediately upstream of a tuned duct 14 and downstream of a flow diode 15. Such apparatus is contained in an essentially closed loop gas flow duct 18, having an exhaust port 20 and a region 22 for injection of make-up gas via nozzles 24 and 26 which admit make-up gases—liquid nitrogen ($LN_2$), carbon dioxide ($CO_2$) and hydrogen ($H_2$) or helium (He) under the control of valves 28, 30 and 32. For reasons discussed hereinafter, the use of helium is preferred over the use of hydrogen.

A control valve 34 operated by controller 36 regulates the amount of exhaust in response to pressure and temperature signals detected respectively by probe 38 and probe 40 and controllers 42 and 44 whose outputs are integrated in a controlled dial position command means 46 to operate controller 36. The temperature controller 42 also provides make-up flow command signals to valves 28, 30 and 32. The structure of the controllers 42, 44 and 46 and consequent regulation thereby of elements 34, 36 and 28, 30 and 32, may comprise simple negative feed-back signaling with or without upper and lower limits or various threshholds of valve actuation and reference calibrations, all of which would be obvious to one of ordinary skill in the art to implement. Thus, if the cavity inlet temperature is too high, the make-up flow rate may be increased and the evaporation of the additional fluid reduces the cavity inlet temperature. Likewise, if the cavity inlet temperature is too low, the make-up flow rate is decreased.

The cavity inlet pressure is measured by probe 38 and an error signal derived therefrom may be used to modulate valve 34 in the exhaust port 20. If the cavity pressure is too high, valve 34 is caused to open to allow more gas to leave the system. If the pressure is too low, valve 34 is closed so that the influx of make-up gas raises the cavity pressure.

Heat exchangers 48 and 50 are provided in duct 18 under the control of controlling elements 52 and 54 which respond to and are controlled by temperature indicators 56 and 58. The temperature indicators actuate the control elements of the heat exchangers to modulate the flow of coolant to maintain a constant heat exchanger gas discharge temperature.

Typically heat exchanger system 48/52 may comprise a water-steam heat exchanger system blowing off steam and having cool make-up water injected therein and heat exchanger system 50/54 may comprise a secondary liquid flow closed loop including exchanger 50 and a primary exchanger (in 54) cooled by ambient air (forced flow).

As noted above, liquid nitrogen, high-pressure carbon dioxide and gaseous helium (or hydrogen) are all available for use as make-up gas. The enthalpy of high-pressure carbon dioxide at ambient temperature is low enough so that, when expanded irreversibly to 150 psia, it will be about 65 percent liquid. Therefore, for intermediate storage, $CO_2$ may be stored in liquid form at moderate pressure. Make-up gas is then injected as liquid nitrogen, liquid carbon dioxide, and gaseous helium or hydrogen, providing significant cooling in the process. For example, 5% make-up can reduce the gas temperature from 322° to 300° K., or from 218° to 200° K., for an average cooling effect over the range of interest of about 20° K. Larger quantities can be injected for greater cooling effect, with a resulting increase in make-up gas, but a corresponding decrease in fixed heat-exchanger and/or refrigeration-system capacity and weight. To minimize the need for mixing downstream, the injected fluids must be distributed as uniformly as possible into a gas stream that is already quite uniform in both temperature and velocity distribution. Injection of liquids as a very fine spray will accelerate vaporization and minimize inhomogeneities caused by gravitational or inertial forces on the droplets tending toward phase separation.

Gas flows around the loop are indicated by the arrows F and electrical and/or mechanical control signaling is indicated by the dashed lines CS.

Additional elements of the apparatus comprise flow smoothers SM and turning vanes TV, electron beam screens EB and an acoustic absorber AA. The screens EB isolate the electric field of the cavity to prevent dissipation of the field or discharge current or short circuits through the apparatus.

The wave pump constituted by elements 12, 14 and 15 utilizes what may be thought as "waste" energy of the system, especially acoustic waves generated in the electrical discharge within the cavity flow, to increase the momentum of the lasable gas medium flowing in duct 18 to an extent substantially or completely obviating the need for a recirculating fan, compressor or the like, together with obviating relating driving and control apparatus. This results in a reduction in weight, volume, power and cost requirements of the laser powering system as a whole.

The above-mentioned acoustic wave phenomena occur primarily in the tuned duct which is tailored to the needs of a particular system in regard to its length, the size and shape of its outlet 16 and the following acoustic chamber 17 forming a part of the essentially closed loop duct 18.

Figure 2B:
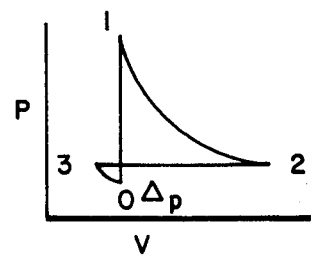
Figure 2C:
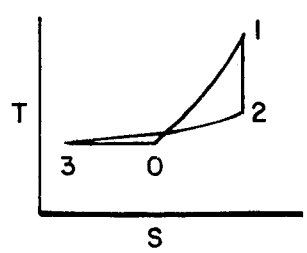

The work available from the cavity gas is that enclosed by the temperature-entropy (T-S) curve shown in FIG. 2C. The pressure-volume relationships are shown in FIG. 2B. Referring now to FIG. 2C, the constant density heating of the gas in the cavity is given by process line 0–1, followed by an isentropic expansion 1–2. The heat is removed by the heat exchangers at constant pressure 2–3. Finally, the friction pressure drop of the heated gas around the loop is represented by 3–0 in which the total temperature stays constant. The available work (W) to pump gas around the loop is the difference between the heat added and the heat removed from the cavity gas $$W = m_c PRR [C_v(T_1 - T_0) - C_p(T_2 - T_0)] \tag{I}$$

where $m_c$ is the mass of gas in the active laser cavity (kg) and PRR is the pulse repetition rate in pulses per second.

The temperature $T_2$ is given by the isentropic expression of the cavity gas $$T_2/T_1 = (p_2/p_1)^{(\gamma-1)/\gamma} \tag{II}$$

The work from the cycle is used to pump the excess gas, i.e., $$W = (m - m_c PRR) C_p T_0 [(p_2/p_0)^{(\gamma-1)/\gamma} - 1] \tag{III}$$

The flush factor, $\beta$, is defined as $m/m_c PRR$. The ideal pressure amplification is obtained as $$\left(\frac{p_2}{p_0}\right)^{\frac{\gamma-1}{\gamma}} = \frac{\frac{1}{\gamma}\left(\frac{T_1}{T_0} - 1\right) + \beta}{\left(\frac{T_1}{T_0}\right)^{\frac{1}{\gamma}} + \beta - 1} \tag{IV}$$

FIG. 2A shows the FIG. 1 apparatus in simplified form for purposes of thermodynamic analysis as comprising the substantially closed loop duct 18 with the cavity 12 having gas therein at a steady state temperature (°K.) of $T_1$ (during discharge current pulses therein), followed by a drop to $T_2$ on expansion and then dropped further through the heat exchangers 48/50/26/22 to $T_3$ and lower to just upstream of flow diode 16. The gas temperature at the entrance to the cavity 12 is $T_0$.

The work available from the cavity gas is that enclosed by the pressure specific volume (P-V) curve.

The effect of cycle efficiency $\eta$ can be taken into account by reducing the available work, represented by the previous expression for ideal pressure amplification, by a factor of $(1-\eta)$, resulting in a pressure amplification given by $$\left(\frac{p_2}{p_0}\right)^{\frac{\gamma-1}{\gamma}} = \frac{\frac{\eta}{\gamma}\left(\frac{T_1}{T_0} - 1\right) + \beta - 1 + \eta}{\eta\left(\frac{T_1}{T_0}\right)^{\frac{1}{\gamma}} + \beta - 1} \quad (V)$$

This expression with $\eta = 0.75$ has been evaluated and shown to be feasible.

The pressure amplification produced in a weak function of the particular laser gas composition whereas the pressure amplification requirements are strongly dependent on the laser gas composition. It is, therefore, possible to optimize the closed cycle for tuned pulsing by selecting the laser gas composition.

The important design parameter is the temperature ratio, $T_1/T_0$ which is established from the energy loading of the gas, taking account of the energy removed by lasing power output, i.e., $$\frac{T_1}{T_0} = \frac{(j/l)_i(1 - \eta_L)}{1000 \, \rho \, c_v T_o}$$

where $(j/l)_i$ is the total energy input per pulse (joules/liter), $\eta_L$ is the laser efficiency, $\rho$ is the gas density (gm/cm$^3$) and $c_v$ is the specific heat at constant volume (joules/gm°C.). This temperature ratio is insensitive to the laser gas compositions as long as the energy input is equal. Comparison between a mixture with hydrogen and one with helium is shown in the following table.

TABLE I

| LASER GAS MIXTURE COMPARISON | | |
|---|---|---|
| | Hydrogen Mixture | Helium Mixture |
| Molecular Weight | 31.28 | 18.66 |
| Temperature Ratio $T_1/T_o$ | 2.36 | 2.50 |
| Pressure Amplfication $P_2/P_o$ | 1.149 | 1.163 |
| Dynamic Pressure q/$P_o$ | 0.0243 | 0.0147 |
| Acceptable Pressure Loss $\Delta p/q$ | 6.1 | 11.1 |

The energy loading results in 715 joules/liter heating for both gases with comparable temperature rise and pressure application; however, since the helium gas density is lower, a lower dynamic pressure is realized for that mixture. The pressure losses in the recirculating systems are directly related to the dynamic pressure, hence the losses for the helium mixture will be less; or in terms of the pressure amplification, a less efficient design of the recirculation system is acceptable with the lower molecular weight gas mixture. The acceptable losses of a system in accordance with the invention exceed those realized in practice such as, for example, in the HPL laser manufactured and sold by the Avco Everett Research Laboratory, Inc., Everett, Massachusetts. This laser operates with an acceptable pressure loss ratio of about five.

Figure 3:
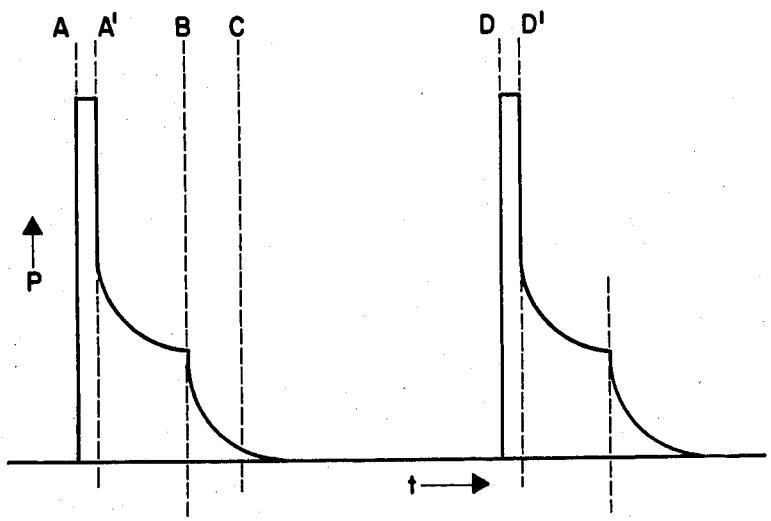
FIG. 3 is a pressure-time curve showing the pressure cycles maintained by the lasing cavity-duct-diode subcombination of the FIG. 1 apparatus.

FIG. 3 is a graph of pressure on the flow diode element 16 of FIG. 1.

At an initial point in time indicated at A at the extreme left, the diode is closed and the pressure on the diode is at a maximum. The lasing cavity 12 is operated so that the pulse (sustainer) current discharge occurs in the cavity at A. After a short time interval (A-A'), the cavity pressure declines as a result of the wave generated therein until at time point B where an expansion wave generated in the tuned duct arrives at the flow diode causing it to open. Pressure with a time period from B-C further declines down to zero. During the time period indicated from C-D, there is a continual flow through the duct until D when the diode is closed by a compression wave arriving at the diode and the cycle as previously described is repeated. The electron beam may be continually supplied to the lasing cavity, however, at a level which does not produce the "excess energy" gas heating, such heating being produced by the sustainer current pulses established across the electrodes (not shown) in the lasing cavity. Such surges of sustainer current discharge occur at time periods A-A' and D-D'.

Figure 4:
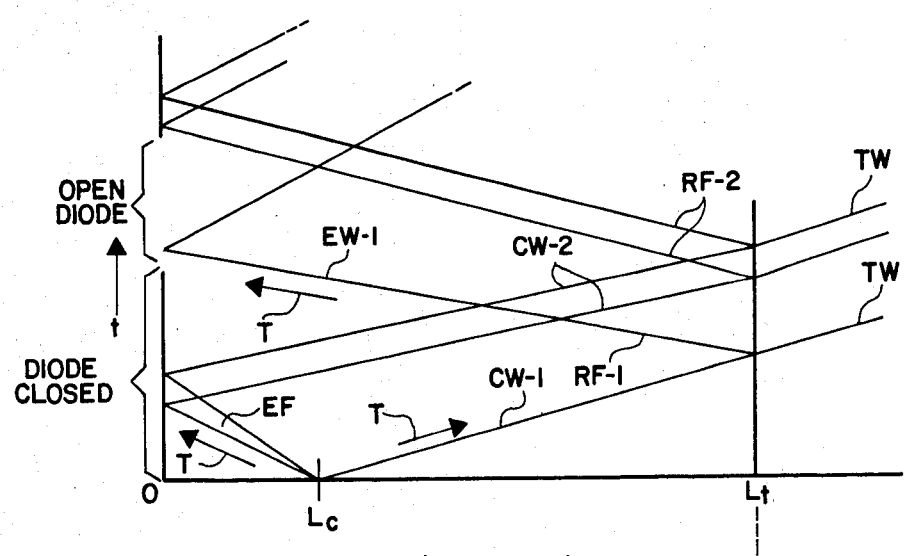
FIG. 4 is a wave diagram showing wave pump action with respect to the said cavity-duct-diode subcombination.

The same concepts are also graphically illustrated in FIG. 4 which is a wave diagram comprising an X-axis of distance wherein $L_c$ indicates the downstream end of the lasing cavity and $L_t$ indicates the termination end of the tuned duct. The Y-axis is a time scale for the first cycle and beginning of a second cycle as illustrated in FIG. 3. In FIG. 4, a first compression wave CW-1 travels from $L_c$ to $L_t$ and is reflected back as an expansion wave EW-1, the direction of wave travel as being indicated by the arrows T. At the same time as the compression wave at CW-1 is generated, there is an expansion fan (EF) backwave which travels back to the flow diode and is reflected as a series of compression waves CW-2 which are in turn reflected as reflection waves RF-2 from the termination of the tuned duct at $L_t$. Additional reflected waves are indicated at RF-1.

The foregoing compression waves CW-2 are reflected at $L_t$ in part as reflection waves RF-2 as indicated above and transmitted in part as indicated as transmitted waves TW. The waves CW-1, RF-2, etc., per se, accomplish the diode opening and closing as indicated on the Y-axis. Therefore, it can be seen that if the tuned duct length ($L_t$ minus $L_c$) were made longer, there would be a longer period where the diode is open between cycles, or conversely, a shorter tuned duct would result in a shorter period of the diode being open.

Figure 5:
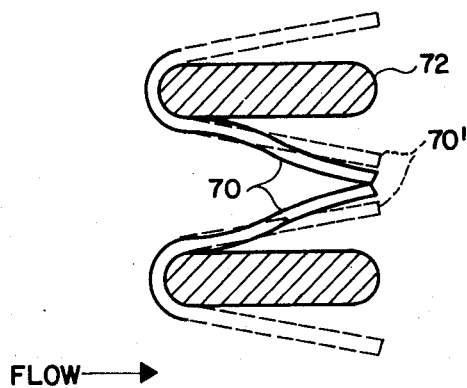
FIG. 5 is a cross section view of a portion of a flapper valve assembly constituting an exemplary flow diode for use in the FIG. 1 apparatus.

A typical flow diode is shown in FIG. 5 and comprises flapper legs 70 mounted on and fastened to support bars 72 which are pressure responsive to the expansion and compression waves respectively as previously described, for opening and closing actions. The open positions are indicated by dashed lines at 70'. This arrangement provides a small opening-closing path and accomodates high pulsing rates of, for example, 100–200 pps. The blades are preferably made of high strength, stiff nonmetallic materials such as, for example, glass boron or carbon fiber reinforced plastics and may be fastened to the support bars by means such as high-strength epoxy cement.

The various features and advantages of the invention are thought to be clear from the foregoing description.

Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims

We claim:

1. Gas laser apparatus comprising:
   means defining an optical resonant cavity having a gas inlet and a gas outlet within a substantially closed loop flow path for a lasable gas having gas laser states,
   means for cyclically pumping the gas laser states within the cavity to produce lasing action and excess energy, in turn cyclically producing pressure waves therein,
   means for coupling said lasing action out of said cavity,
   means within said closed loop flow path for utilizing said pressure waves to cyclically pump gas around the closed loop gas flow path, and
   means within said closed loop flow path to cool the pumped gas to limit heat build-up therein over the course of multiple pumping cycles.

2. Gas laser apparatus in accordance with claim 1 wherein the said means for utilizing said pressure waves comprise gas flow diode means coupled to said cavity gas inlet in the gas flow path upstream of the cavity for cyclically obstructing gas flow to the cavity.

3. Gas laser apparatus in accordance with claim 2 wherein said means for utilizing said pressure waves further comprise tuned duct means coupled to said gas outlet located in the gas flow path downstream of the cavity for receiving gas from the cavity and establishing diode opening and closing and cyclic propulsion of gas around the gas flow path.

4. Gas laser apparatus in accordance with any of claims 1-3 wherein said cooling means comprise gas injection means for injecting gas into the gas flow path, partial exhaust means for exhausting gas from the gas flow path and control means for balancing injection and exhaust in relation to gas conditions at the cavity to maintain gas conditions suitable for cyclic pulsed lasing operation.

5. In a gas laser apparatus of the type having a cyclically intermittent discharge current for producing lasing action in an optical resonant cavity having a gas inlet and a gas outlet producing energy in excess of the lasing action in the cavity, cyclical gas exhaust from and refilling of the cavity and means for coupling the lasing action out of the cavity,
   the improvement comprising flow diode means coupled to said gas inlet for supplying gas to the cavity constructed and arranged to be closed by a pressure wave produced by the excess energy to produce said exhaust of gases from the cavity and a subsequent pressure drop therein which causes the diode means to open to allow said gas flow into the cavity for refilling.

6. The apparatus of claim 5 as a substantially closed loop system.

7. The apparatus of claim 6 in combination with tuned duct exhaust conduit means for receiving gas from the cavity,
   tuning the said pressure wave by reflecting the pressure wave back towards the flow diode means with a phase change for auto-controlling cycling of the flow diode means, the tuned duct means being dimensioned to establish a predetermined cycle rate.

8. Gas laser apparatus comprising:
   means defining an optical resonant cavity having a gas inlet and a gas outlet within a substantially closed loop flow path for a lasable gas having gas laser states,
   means for cyclically pumping gas laser states within the cavity to cyclically produce lasing action, excess energy and pressure waves in the gas,
   means for coupling said lasing action out of said cavity,
   gas flow diode means coupled to said gas inlet for cyclically obstructing gas flow to the cavity,
   tuned duct means coupled to said gas outlet located in the gas flow path downstream of the cavity for receiving gas from the cavity for producing compression and expansion waves in the gas within the cavity upon pumping and gas laser states within the cavity, said tuned duct means establishing diode opening and closing by said compression and expansion waves to effect cyclic propulsion of gas around the gas flow path,
   means for controllably exhausting gas from said gas flow path,
   means for controllably injecting lasable gas into said gas flow path at a temperature substantially less than that of pumped gas in said duct; and
   means for controllably balancing the injection and exhausting of gas to substantially maintain predetermined gas conditions in the cavity for cyclic pulsed lasing operation.

* * * * *